(12) United States Patent
Eklund, II

(10) Patent No.: US 8,329,277 B2
(45) Date of Patent: ***Dec. 11, 2012

(54) DETERRING THEFT OF OPTICAL MEDIA

(75) Inventor: Don Charles Eklund, II, Yorba Linda, CA (US)

(73) Assignees: Sony Coporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,216

(22) Filed: Feb. 7, 2011

(65) Prior Publication Data

US 2011/0134734 A1    Jun. 9, 2011

Related U.S. Application Data

(63) Continuation of application No. 11/228,554, filed on Sep. 16, 2005, now Pat. No. 7,892,618.

(60) Provisional application No. 60/664,164, filed on Mar. 21, 2005.

(51) Int. Cl.
    *B32B 3/02*    (2006.01)
(52) U.S. Cl. .................. 428/64.1; 428/64.4; 430/270.11
(58) Field of Classification Search .................. 428/64.4; 430/270.11
    See application file for complete search history.

(56) References Cited

U.S. PATENT DOCUMENTS

| | | | |
|---|---|---|---|
| 5,164,287 A | 11/1992 | Nagae et al. | |
| 5,173,381 A | 12/1992 | Natansohn et al. | |
| 5,436,885 A | 7/1995 | Okumura et al. | |
| 5,521,984 A | 5/1996 | Denenberg et al. | |
| 5,673,338 A | 9/1997 | Denenberg et al. | |
| 5,753,511 A | 5/1998 | Selinfreund | |
| 5,815,484 A | 9/1998 | Smith et al. | |
| 5,970,035 A | 10/1999 | Ohmori et al. | |
| 6,011,772 A | 1/2000 | Rollhaus et al. | |
| 6,044,046 A | 3/2000 | Diezmann et al. | |
| 6,232,124 B1 | 5/2001 | Selinfreund | |
| 6,458,595 B1 | 10/2002 | Selinfreund | |
| 6,490,030 B1 | 12/2002 | Gill et al. | |
| 6,512,580 B1 | 1/2003 | Behringer et al. | |
| 6,589,626 B2 | 7/2003 | Selinfreund et al. | |
| 6,638,593 B2 | 10/2003 | Selinfreund et al. | |
| 6,707,539 B2 | 3/2004 | Selinfreund et al. | |

(Continued)

FOREIGN PATENT DOCUMENTS

JP    03-292690    12/1991

(Continued)

OTHER PUBLICATIONS

Flexplay Introduces 'ex-D' the 48-Hour DVD, Aug. 6 2005, 2 pages, <http://electronics.howstuffworks.com/flexplay.htm>.

(Continued)

*Primary Examiner* — Elizabeth Mulvaney
(74) *Attorney, Agent, or Firm* — Trellis IP Law Group, PC

(57) ABSTRACT

An optical media disk is treated with a light-sensitive material that impedes the ability of an optical media player from reading data stored on the disk. This light-sensitive material is a material that changes phase upon exposure to one or more wavelengths of light. During the initial phase, the light-sensitive material will render the disk unreadable. After activation, however, the disk becomes permanently readable by conventional optical media players. In this fashion, theft of yet-to-be-activated optical media is deterred.

23 Claims, 3 Drawing Sheets

U.S. PATENT DOCUMENTS

| | | |
|---|---|---|
| 6,838,145 B2 | 1/2005 | Drew et al. |
| 6,952,392 B2 | 10/2005 | Vig et al. |
| 7,270,866 B2 | 9/2007 | Noraev |
| 2002/0001690 A1 | 1/2002 | Selinfreund et al. |
| 2002/0054566 A1 | 5/2002 | Netsu et al. |
| 2002/0114265 A1 | 8/2002 | Hart et al. |
| 2003/0018586 A1 | 1/2003 | Krahn |
| 2003/0047610 A1 | 3/2003 | Selinfreund et al. |
| 2003/0081521 A1 | 5/2003 | Solomon et al. |
| 2003/0123050 A1 | 7/2003 | Selinfreund et al. |
| 2003/0147339 A1 | 8/2003 | Selinfreund et al. |
| 2003/0152019 A1 | 8/2003 | Thompson et al. |
| 2003/0218739 A1 | 11/2003 | Saglimbeni et al. |
| 2003/0219124 A1 | 11/2003 | Selinfreund et al. |
| 2004/0000787 A1 | 1/2004 | Vig et al. |
| 2004/0004922 A1 | 1/2004 | Selinfreund et al. |
| 2004/0022542 A1 | 2/2004 | Atkinson |
| 2004/0023397 A1 | 2/2004 | Vig et al. |
| 2004/0110088 A1 | 6/2004 | Vig et al. |
| 2004/0115385 A1 | 6/2004 | Drew et al. |
| 2004/0118931 A1 | 6/2004 | Selinfreund et al. |
| 2004/0121262 A1 | 6/2004 | Selinfreund et al. |
| 2004/0152017 A1 | 8/2004 | Vig et al. |
| 2004/0171577 A1 | 9/2004 | Uckun et al. |
| 2004/0236588 A1 | 11/2004 | Millard et al. |
| 2005/0050343 A1 | 3/2005 | Selinfreund et al. |
| 2005/0063256 A1 | 3/2005 | Selinfreund et al. |
| 2005/0069670 A1 | 3/2005 | Noraev |
| 2005/0083829 A1 | 4/2005 | Selinfreund et al. |
| 2005/0084645 A1 | 4/2005 | Selinfreund et al. |
| 2005/0107607 A1 | 5/2005 | Vig et al. |
| 2005/0153109 A1 | 7/2005 | Drew et al. |
| 2005/0153128 A1 | 7/2005 | Selinfreund et al. |
| 2005/0153995 A1 | 7/2005 | Vig et al. |
| 2005/0186382 A1 | 8/2005 | Vig et al. |
| 2005/0243305 A1 | 11/2005 | Vig et al. |
| 2006/0023600 A1 | 2/2006 | Selinfreund et al. |
| 2006/0078707 A1 | 4/2006 | Selinfreund |
| 2006/0114755 A1 | 6/2006 | Eklund |
| 2006/0234003 A1 | 10/2006 | Selinfreund |
| 2007/0050585 A1 | 3/2007 | New et al. |
| 2007/0170606 A1 | 7/2007 | New |
| 2008/0225424 A1 | 9/2008 | New |

FOREIGN PATENT DOCUMENTS

| | | |
|---|---|---|
| JP | 05-159365 A | 6/1993 |
| JP | 2002-516014 A | 5/2002 |
| JP | 2002-516017 A | 5/2002 |
| WO | WO 98/11539 A1 | 3/1998 |
| WO | WO 98/41979 A1 | 9/1998 |
| WO | WO-9941738 A1 | 8/1999 |
| WO | WO-0203386 A2 | 1/2002 |
| WO | WO 02/103691 A1 | 12/2002 |
| WO | WO-03087888 A2 | 10/2003 |
| WO | WO 2006/113516 A2 | 10/2006 |

OTHER PUBLICATIONS

Harris, Tom, How Flexplay DVDs Work, How Stuff Works, 11 pages, <http://electranics.howstuffworks.com/flexplay.htm>.

Extended European Search Report dated Apr. 6, 2011 issued to European Application No. 06 73 8030.

DETERRING THEFT OF OPTICAL MEDIA

CROSS REFERENCE TO RELATED APPLICATION

This application is a continuation of U.S. Ser. No. 11/228,554 filed on Sep. 16, 2005, published as U.S. Patent Application Publication 2006/0114755A1 on Jun. 1, 2006, which is hereby incorporated by reference in its entirety.

FIELD OF THE INVENTION

The invention relates in general optical media content, and in particular, to preventing unauthorized access of the media content until the media is activated by exposure to a predetermined light source.

BACKGROUND OF THE INVENTION

Optical data storage media ("optical media") are media in which data is stored in an optically readable manner. Data is encoded by optical changes in one or more layers of the media. Formats of optical medium include read-only formats such as CD-DA (digital audio compact disc), CD-ROM (CD-read-only memory), DVD (digital versatile disc or digital video disc) Blu-ray ROM media, write-once read-many times (WORM) formats such as CD-R (CD-recordable), and DVD-R (DVD-recordable), as well as rewritable formats such as found on magneto-optical (MO) discs, CD-RW (CD-rewriteable), DVD-RAM (DVD-Random Access Media), DVD-RW or DVD+RW (DVD-rewriteable), PD (Phase change Dual disk by Panasonic), Blu-ray RE and other phase change optical discs.

Optical media are susceptible to theft all along the supply chain. For example, optical media disks are commonly placed on shelves in the retail-leasing establishment, thereby being susceptible to theft. Even if the optical media disks are stored in cases containing, for example, an electronic article surveillance ("EAS") tag or label, the optical media can typically be removed from the storage case with difficulty. In fact, optical media are susceptible to being removed from shipping cartons or from individual cases before even reaching a final point of sale.

Current approaches to combating the optical media theft problem have been to make the media cases difficult to open, embed EAS or RFID tags in the media cases, increase video surveillance along the supply chain, or simply reducing consumer's unsupervised access to the product. However, each of these approaches is met with several disadvantages, including easy of circumvention and cost.

In addition to the theft problem of optical media, it may some times be desirable to prevent access of the optical media content that is otherwise lawfully being possessed. For example, one may want to distribute optical media but delay its access until the occurrence of some future event (e.g., payment).

Thus, there is still an unsatisfied need for a system and method for preventing the unauthorized access of optical media content.

SUMMARY OF THE EMBODIMENTS

Systems and methods for preventing the unauthorized access of optical media content are disclosed. In one embodiment, a method includes encoding data on an optical media, treating a substrate surface of the optical media with a light-sensitive material that is in a first phase, where the light-sensitive material deters theft of the optical media by causing the encoded data to be unreadable while in the first phase. The method further includes activating, prior to a point of sale of the optical media, the light-sensitive material using a light source having a predetermined wavelength, wherein activating the light-sensitive material causes it to change from the first phase to a second phase, after which the encoded data is readable.

Other embodiments are disclosed and claimed herein.

DETAILED DESCRIPTION OF THE EXEMPLARY EMBODIMENTS

One aspect of the invention is to treat optical media with a light-sensitive material which impedes the ability of an optical media player from reading data stored on the optical media. In one embodiment, this light-sensitive material may be any material capable of being activated so as to change in a physically measurable manner, upon exposure to one or more wavelengths of light. In another embodiment, the light-sensitive material may be any embodiment of the light-changeable compounds disclosed in U.S. Pat. No. 6,589,626, which issued on Jul. 8, 2003, and which is hereby fully incorporated by reference (hereinafter the "'626 Patent").

Another aspect of the invention is to activate the treated optical media using a particular wavelength (or range of wavelengths) of light, thereby causing the aforementioned light-sensitive material to change its phase such that conventional optical media players will be able to subsequently read the media's encoded data. While in one embodiment, the entire optical media may be treated with the light-sensitive material, in another embodiment only particular sections may be treated. According to one embodiment, once activated, the light-sensitive material will permanently remain in its new state. In one embodiment, the light source is a mercury light source, however numerous other light sources may be similarly used.

In one embodiment, optical media are treated with the aforementioned light-sensitive material shortly after the traditional data encoding process is complete. The optical media is then placed in the supply chain for delivery to its ultimate point of sale. After a particular point in the supply chain, the optical media may be activated using a predetermined wavelength of light. It should be appreciated that the predetermined wavelength of light, or range thereof, will depend on the particular light-sensitive material used, as disclosed in the '626 Patent. While in one embodiment, activation occurs at the final point of sale, it may similarly occur at some earlier point along the product supply line. In this fashion, theft of the yet-to-be-activated optical media is deterred since it will be unreadable. It may further be desirable to label the optical media (or its casing) as being inactive so as to increase the deterrent effect.

The physical specifications for optical media are standards known in the art. All media dimensions, including those pertaining to pit and physical formations, which encode data, are defined in the CD standard. For example, specifications information on sampling frequency, quantization word length, data rate, error correction code, and modulation scheme are all defined in the standard. Properties of the optical system that reads data from the disc using a laser beam are also defined in the standard.

Figure 1A:
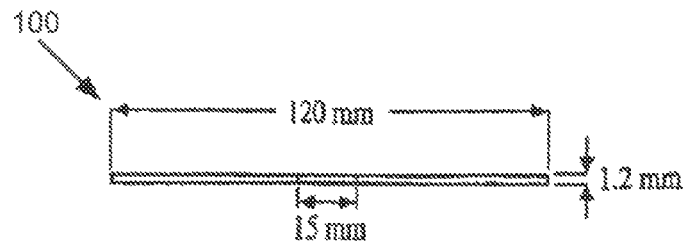
FIGS. 1A-1B depict typical optical media disks from a side view and cross-section, respectively.
Figure 1B:
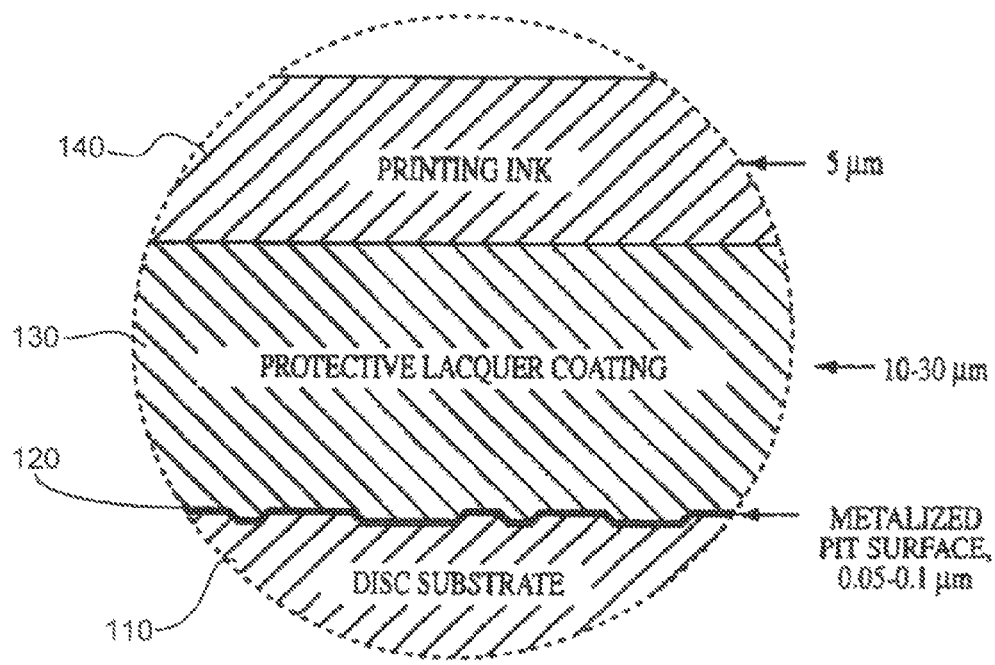

Referring to prior art FIGS. 1A and 1B, the physical characteristics of a typical optical media surface are described. In FIG. 1A, optical disk 100 is approximately 120 mm in diameter. The innermost portion of the disk is a hole, with a diameter of approximately 15 mm, usable to mount the optical disk to a rotating mount coupled to a spindle motor shaft.

Referring now to FIG. 1B, depicted is a magnified cross-section of optical disk's 100 surface. As shown, the disk substrate 110 is typically a plastic substrate which comprises most of the disk's overall thickness. Directly on the disk substrate, a thin metal layer 120 of generally aluminum, silver or gold is deposited. Data is physically contained in the metalized pits impressed along the optical disk's surface, as shown in FIG. 1B. Above this metalized pit surface 120 and disc substrate 110 is deposited a protective lacquer coating 130 which is typically between 10 and 30 micrometers thick. An identifying label 140 (5 micrometers) is often affixed to the top of the lacquer coating.

Continuing to refer to FIGS. 1B, a beam of laser light is used to read the data from the encoded media surface. A laser beam, which is focused on the metalized data surface 120, is applied to the underside of the disk such that it passes through the transparent disk substrate 110 and back out again. As the disk rotates, the laser beam moves across the disc from the center to the edge. Binary code signals generated by the beam's reflective pattern are then converted into digital data such as, for example, audio and video data. The media must present two states so the change between them varies the reflected light, and thus data can be recognized. Data can be represented as a phase change, polarization change, or change in the intensity of the reflected light.

Figure 2:
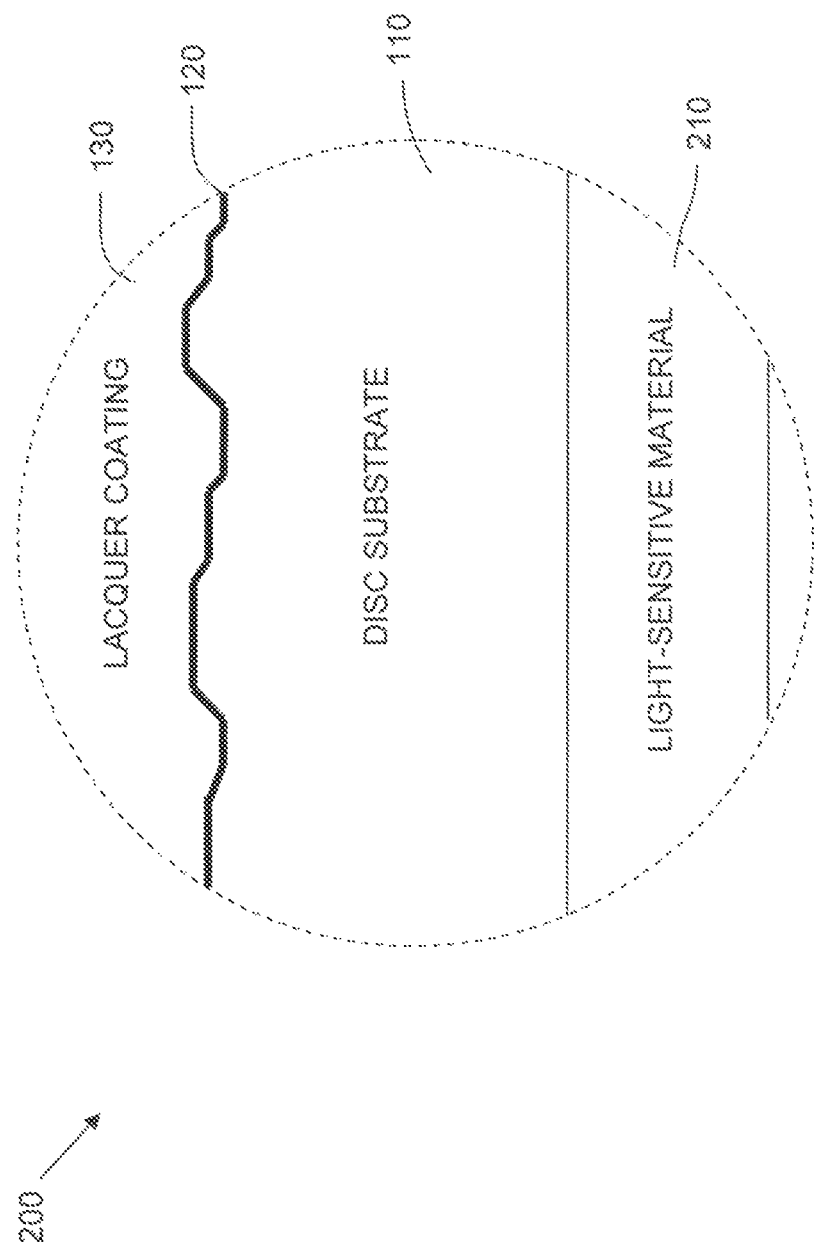
FIG. 2 is a cross-sectional view of an optical media disk consistent with one embodiment of the invention.

Referring now to FIG. 2, depicted is a cross-sectional view of an optical media disk 200 consistent with one embodiment of the invention. In this embodiment the underside of the optical disk 200, which is comprised of the disk substrate, has been coated with a light-sensitive material 210. It should be appreciated that numerous methods of applications may be used and be consistent with the invention. For example, any of the techniques disclosed in the '626 Patent may be used, such as by placing the light-sensitive material between two substrates, applying it as a polymeric film to the disk 200, etc.

In one embodiment, the light-sensitive material 210 prevents the optical media disk 200 from being read by a conventional optical media player. That is, the laser beam reflection pattern is altered by the applied light-sensitive material 210. However, the nature of the light-sensitive material 210 is that some of its physical properties can be altered by exposure to particular wavelengths of light. That is, in one embodiment exposing the light-sensitive material 210 to a certain type of light will cause the phase of the light-sensitive material 210 to change, thereby allowing the optical disk 200 to be read again. In one embodiment, the activating light source is a mercury-based light source.

Figure 3:
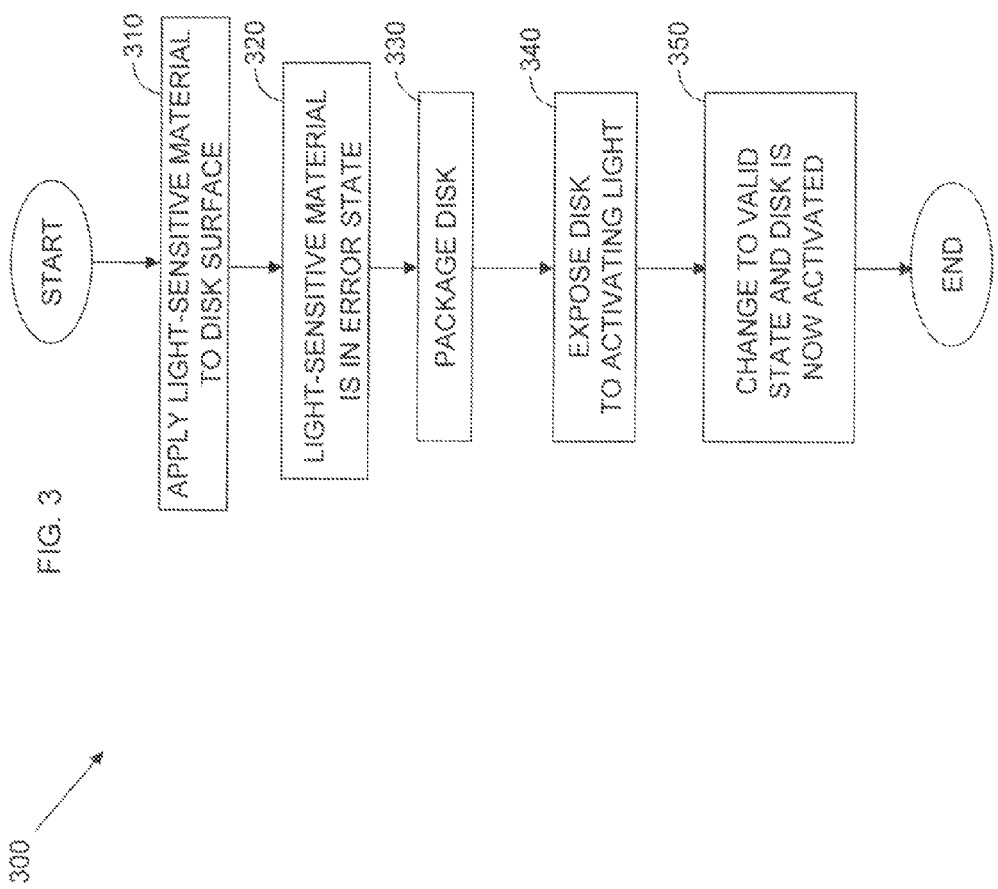
FIG. 3 is a flow diagram for a process of implementing one embodiment of the invention.

Referring now to FIG. 3, depicted is one embodiment of a process for implementing one or more aspects of the invention. This process assumes that data has already been recorded to the subject disk. Process 300 begins at block 310 with the light-sensitive material (e.g., material 210) being applied to the disk substrate. As previously mentioned, it should be appreciated that numerous methods of applications may be used and be consistent with the invention. However, in one embodiment the most (or all) of the disk surface may be coated with the light-sensitive material.

At this point, the applied light-sensitive material has placed the disk in an error state (block 320), rendering it unreadable by a traditional optical media player. In one embodiment, this error state is a result of the optical media player's laser not being able to accurately penetrate the light-sensitive material covering the disk surface. The disk may then be packaged for shipment out to the end user at block 330. In one embodiment, theft of the disk at any point along the supply chain will be deterred by the fact that the disk is unreadable until proper activation.

Continuing to refer to FIG. 3, process 300 continues to block 340 where the treated disk may be activated. In one embodiment, activation is accomplished by exposing the disk surface (and hence the light-sensitive material itself) to a particular light wavelength or range of wavelengths. In one embodiment, the disk may be activated (i.e., exposed to the activating light) while still in a case. In situations where the optical media is being stored and/or displayed in a transparent or translucent plastic storage case, the activation process can occur through the case itself so long as the case is at least translucent to the particular wavelength of light being used to activate the enclosed media.

As previously mentioned, the light-sensitive or light-changeable material of the invention may be any of the light-sensitive or light-changeable materials disclosed in the '626 Patent. For example, the light-sensitive material may be organic material or inorganic material; a cyanine compound; an organic light-changeable material excitable by a light source emitting light at a wavelength between about 770 nm to about 830 nm or between about 630 nm to about 650 nm; or an inorganic material capable of undergoing a phase change from an amorphous state to a crystalline state by absorption of energy from one or more wavelengths of light. In one embodiment, the inorganic phase-change light-changeable material may be GeSbTe, InSbTe, InSe, AsTeGe, $TeO_x$—GeSn, TeSeSn, SbSeBi, BiSeGe and AgInSbTe-type materials, as disclosed in the '626 Patent.

Once activated, the phase of the light-sensitive material changes to a valid state, thereby permitting conventional optical media players to read the encoded data (block 350). In one embodiment, the activating light source may be located at the point of sale of the optical media in question. In another embodiment, the optical media itself, or the case in which it is contained, may be labeled in a fashion which indicates that the media is unreadable until activated. In this fashion, the optical media will be rendered useless to a would-be thief until it is actually purchased by an end user.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. An optical media disk comprising a substrate surface having data encoded thereon, the substrate surface being treated with a light-sensitive material that is initially in a first phase, wherein the light-sensitive material deters theft of the optical media disk by causing the encoded data to be unreadable while the light-sensitive material is in the first phase, and wherein the light-sensitive material is to be changed from the first phase to a second phase, prior to a point of sale of the optical media disk, when exposed to a mercury-based light source having a predetermined wavelength, the encoded data to be readable when the light-sensitive material is in the second phase, and wherein the light-sensitive material is to permanently remain in the second phase after being exposed to the light source.

2. A method of controlling data access, comprising:
encoding data on an optical medium;
concealing the encoded data by treating at least one section of the optical medium with a light-sensitive material; and
permanently revealing the encoded data by activating the light-sensitive material with a light source.

3. The method of claim 2 wherein the treating comprises placing the light-sensitive material on an optical medium substrate surface.

4. The method of claim 2 wherein the treating comprises placing the light-sensitive material between an optical medium substrate surface and a second substrate.

5. The method of claim 2 wherein the light-sensitive material undergoes a phase change upon the activating.

6. The method of claim 2 wherein the light source has a predetermined wavelength.

7. The method of claim 2 wherein the light source is a mercury-based light source.

8. The method of claim 2 wherein the activating occurs through a case housing the optical medium.

9. The method of claim 2 wherein optical medium theft is deterred.

10. The method of claim 2 wherein the activating occurs prior to a sale of the optical medium.

11. The method of claim 2 further comprising labeling the optical medium to indicate that it is unreadable until activated.

12. The method of claim 2 wherein the encoded data is unreadable by a conventional optical media player prior to the activating and is permanently readable by the conventional optical media player thereafter.

13. An apparatus for controlling data access, comprising:
an optical media disk having data encoded thereon;
a light-sensitive material placed on at least one section of the optical media disk to conceal the encoded data; and
a light source that permanently reveals the encoded data by activating the light-sensitive material.

14. The apparatus of claim 13 wherein the light-sensitive material is on an optical media disk substrate surface.

15. The apparatus of claim 13 wherein the light-sensitive material is between an optical media disk substrate surface and a second substrate.

16. The apparatus of claim 13 wherein the light-sensitive material undergoes a phase change upon the activating.

17. The apparatus of claim 13 wherein the light source has a predetermined wavelength.

18. The apparatus of claim 13 wherein the light source is a mercury-based light source.

19. The apparatus of claim 13 wherein the activating occurs through a case housing the optical media disk.

20. The apparatus of claim 13 wherein optical media disk theft is deterred.

21. The apparatus of claim 13 wherein the activating occurs prior to a sale of the optical media disk.

22. The apparatus of claim 13 further comprising a label indicating the optical media disk is unreadable until activated.

23. The apparatus of claim 13 wherein the encoded data is unreadable by a conventional optical media player prior to the activating and is permanently readable by the conventional optical media player thereafter.

* * * * *